United States Patent
Achrekar

(10) Patent No.: US 8,800,726 B2
(45) Date of Patent: Aug. 12, 2014

(54) DUAL-ROTOR FORCE TRANSMITTING ASSEMBLY

(75) Inventor: Nilesh Arun Achrekar, Mumbai (IN)

(73) Assignee: Eaton Corporation, Cleveland, OH (US)

(*) Notice: Subject to any disclaimer, the term of this patent is extended or adjusted under 35 U.S.C. 154(b) by 189 days.

(21) Appl. No.: 13/370,834

(22) Filed: Feb. 10, 2012

(65) Prior Publication Data

US 2013/0206532 A1    Aug. 15, 2013

(51) Int. Cl.
*F16D 55/04*    (2006.01)
*F16D 55/36*    (2006.01)
*F16D 25/0638*    (2006.01)

(52) U.S. Cl.
USPC ............. 188/71.5; 188/71.3; 192/85.37

(58) Field of Classification Search
CPC ............ F16D 2055/0091; F16D 65/18; F16D 2121/02; F16D 55/40; F16D 55/36; F16D 55/14; F16D 2055/0058; B60K 6/387
USPC ....... 188/1.11 R, 1.11 W, 218 XL, 71.1, 71.3, 188/71.5, 72.4; 192/85.37
See application file for complete search history.

(56) References Cited

U.S. PATENT DOCUMENTS

| | | | |
|---|---|---|---|
| 2,666,503 A * | 1/1954 | McCune | 188/73.2 |
| 3,286,795 A * | 11/1966 | Raciunas et al. | 188/71.5 |
| 4,083,436 A * | 4/1978 | Straut | 188/265 |
| 4,128,145 A * | 12/1978 | Euler | 188/71.2 |
| 4,207,968 A * | 6/1980 | Chamberlain | 188/71.4 |
| 4,234,061 A * | 11/1980 | Margetts et al. | 188/71.3 |
| 4,529,067 A * | 7/1985 | Scott | 188/18 A |
| 4,863,000 A | 9/1989 | Patel | |
| 4,865,160 A * | 9/1989 | Casey | 188/18 A |
| 5,046,593 A | 9/1991 | Collins et al. | |
| 5,228,543 A * | 7/1993 | Heidenreich | 188/72.4 |
| 5,247,684 A | 9/1993 | Tavares et al. | |
| 5,577,581 A | 11/1996 | Eberwein et al. | |
| 6,409,002 B1 | 6/2002 | Orlamunder et al. | |
| 6,637,568 B2 | 10/2003 | Latsko | |
| 2003/0234149 A1 | 12/2003 | Peterseim et al. | |
| 2004/0112688 A1 | 6/2004 | Rancourt | |
| 2008/0308381 A1 | 12/2008 | Tekesky et al. | |
| 2010/0017087 A1 * | 1/2010 | Degenstein | 701/70 |

FOREIGN PATENT DOCUMENTS

GB    2123502    *    2/1984

OTHER PUBLICATIONS

European Patent Office; International Search Report and Written Opinion in corresponding International Application No. PCT/US2013/025173. Date of Mailing: May 24, 2013.

* cited by examiner

*Primary Examiner* — Vishal Sahni
(74) *Attorney, Agent, or Firm* — Dykema Gossett PLLC

(57) ABSTRACT

A dual-rotor force transmitting assembly includes a powerhead assembly having a spring housing, a plurality of first spring sets that generate a braking force for a first rotor and a plurality of second spring sets that generate a braking force for a second rotor. Using separate spring sets for each rotor ensures application of uniform and equal pressure on both rotors even if there is uneven friction surface wear.

20 Claims, 8 Drawing Sheets

DUAL-ROTOR FORCE TRANSMITTING ASSEMBLY

TECHNICAL FIELD

The present disclosure relates to force transmitting assemblies and more particularly to an annular force transmitting assembly that transmits force via rotors to restrict rotation of a shaft when employed as a brake or to transmit rotation when employed as a clutch.

BACKGROUND

The terms "assembly" and "force transmitting assembly" as used in this disclosure refers to an assembly, such as a split powerhead disc brake, that can function as a brake or a clutch. While the assembly described herein is particularly suited for use as a brake assembly and will be discussed in detail in the braking context, those of ordinary skill in the art will understand that the assembly is equally capable of functioning as a clutch. For simplicity, the term "assembly" will primarily be used, but the term "assembly," "force transmitting assembly," "brake assembly," "split powerhead disc brake," and "clutch assembly" are all interchangeable in the description below.

Known assemblies have been connected with a shaft to control power transmission. These known assemblies have been used in various applications, such as draglines, power shovels, conveyors, shears, power presses, and other machines. When machines have different operating characteristics, the force-transmitting capability of the assembly should be adjusted to correspond to the operating characteristics of the machine in which the assembly will be used. Some machines require transmission of relatively large forces to rotate a shaft or retain a shaft against rotation.

To accommodate these large forces, the assembly may apply frictional forces to two rotors instead of one. This dual rotor structure allows the same amount of torque to be provided in a smaller package. However, it is difficult for one spring set to apply uniform pressure on both rotors.

There is a desire for a multiple rotor assembly that overcomes uneven friction pad wear and maintains uniform pressure on both rotors with no manual intervention.

SUMMARY

An assembly for transmitting force to a shaft according to one aspect of the present teachings includes a mounting flange having a central opening to receive the shaft and first and second rotors mounted on the shaft and rotatable with the shaft. The first and second rotors each have at least one planar surface. The assembly also includes first front and rear reaction plates disposed on opposite sides of the first rotor, and second front and rear reaction plates disposed on opposite sides of the second rotor. The reaction plates each have at least one friction surface that is engageable with the rotors. The assembly also includes a piston and a cylinder coupled to the piston to form a fluid pressure chamber. The piston moves in a first direction when pressurized fluid enters the fluid pressure chamber and the piston moves in a second direction when pressurized fluid exits the fluid pressure chamber. The assembly further includes a spring housing operatively coupled to the piston.

The spring housing itself has a spring plate, a plurality of first spring sets supported in the spring plate and operatively coupled to the first front and rear reaction plates, and a plurality of second spring sets supported in the spring plate and operatively coupled to the second front and rear reaction plates.

DETAILED DESCRIPTION

Figure 1:
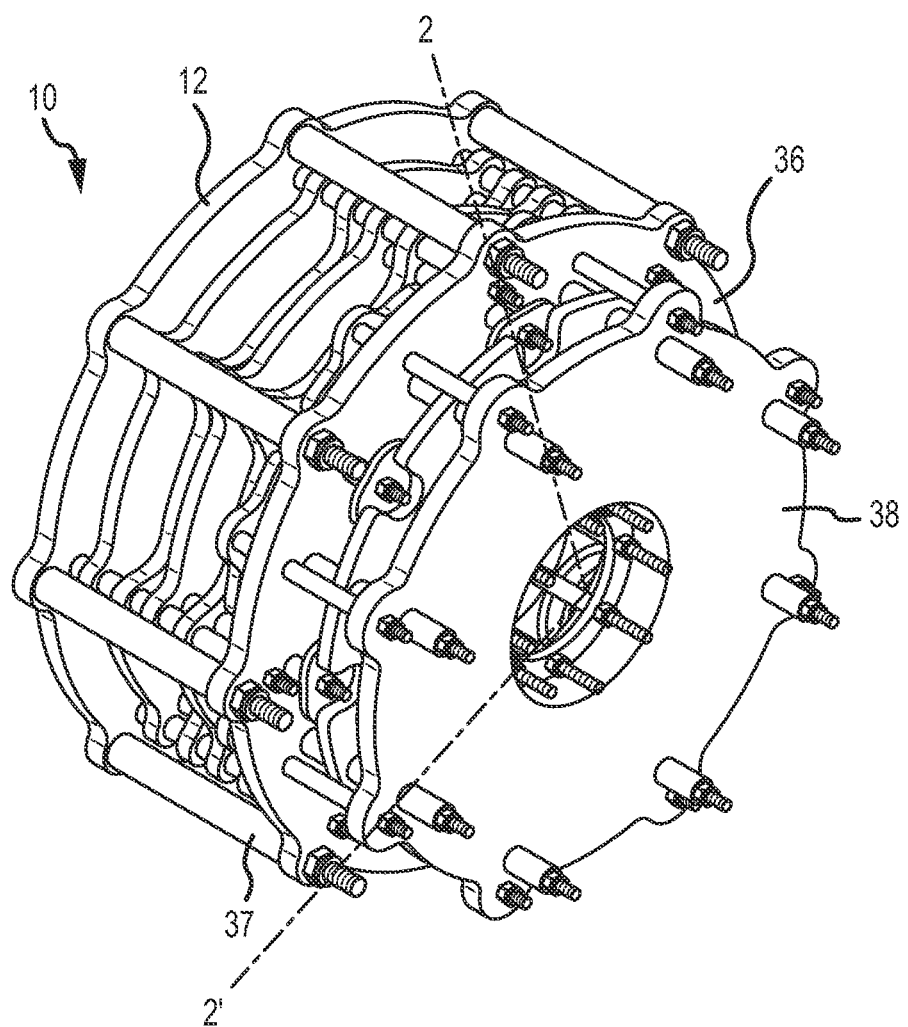
FIG. 1 is a perspective view of an assembly according to one aspect of the system.

FIGS. 1 through 4 and FIG. 8 show an assembly 10 that is operable between a first engaged position, or braking mode, and a second disengaged position, or non-braking mode. When the assembly 10 is in the engaged position (i.e., when fluid pressure is released within the assembly 10), the assembly 10 applies frictional force to retain a driven shaft against rotation. When the brake assembly 10 is in the disengaged position (i.e., when fluid pressure is applied the assembly 10), the assembly 10 allows the shaft to rotate freely.

The assembly 10 includes a mounting flange 12 that allows the assembly 10 to be connected to a customer interface (not shown), such as the frame of a motor or a machine. The assembly 10 also includes first and second rotors 14a, 14b that are designed to be fixed to a driven shaft (not shown) so that they are rotatable therewith. The first rotor 14a is disposed between first front and rear reaction plates 16a, 18a and the second rotor 14b is disposed between second front and rear reaction plates 16b, 18b. The front and rear reaction plates 16a, 16b, 18a, 18b each have friction surfaces 20 (e.g., friction pads) facing their respective rotors 14a, 14b for applying a clamping load on the rotors 14a, 14b.

The rotors 14a, 14b may have a generally cylindrical disc-shape and may each have a central hub 22 with a bore 24 to hold the rotor 14a, 14b on the shaft. The hub 22 itself may either be formed as an integral part of its corresponding rotor 14a, 14b or may be formed as a separate piece and attached to the rotor 14a, 14b with fasteners. In one aspect of the assembly 10, the hub 22 may have a straight bore 24 to be received on a correspondingly straight shaft as shown in the Figures, or the hub 22 may have a tapered bore 24 to fit on a tapered shaft. The rotor 14a, 14b may be held in place with a threaded fastener (not shown) on the end of the shaft.

Alternatively, the rotor 14a, 14b may be held in place by the hub 22 via a keyless locking bushing on a straight or tapered shaft. Each rotor 14a, 14b has a planar surface 26 on each side to act as a working surface area for frictional engagement with the friction surfaces 20 of the reaction plates 16a, 16b, 18a, 18b.

The friction surfaces 20 themselves can include any appropriate friction material in any desired configuration. For example, the friction surfaces 20 may be formed as a single annular surface or as a plurality of friction pads. The surface or pads may be replaceable, if desired. Those of ordinary skill in the art will understand that the friction surfaces 20 can have any composition or configuration without departing from the scope of this disclosure.

The assembly 10 may also include a cylinder 38 coupled to the piston 32 so that the piston 32 can slide relative to the cylinder 38. The piston 32 is disposed within the cylinder 38 to form a fluid chamber 41 that can receive a pressurized fluid (e.g., pressurized air or hydraulic fluid). Under pressurized conditions, the piston 32 moves in the direction shown in arrow A in FIGS. 2 and 3. The piston 32 and cylinder 38 can float over a small guide tube 43. The small guide tube 43 is connected to the spring housing 36.

Figure 8:
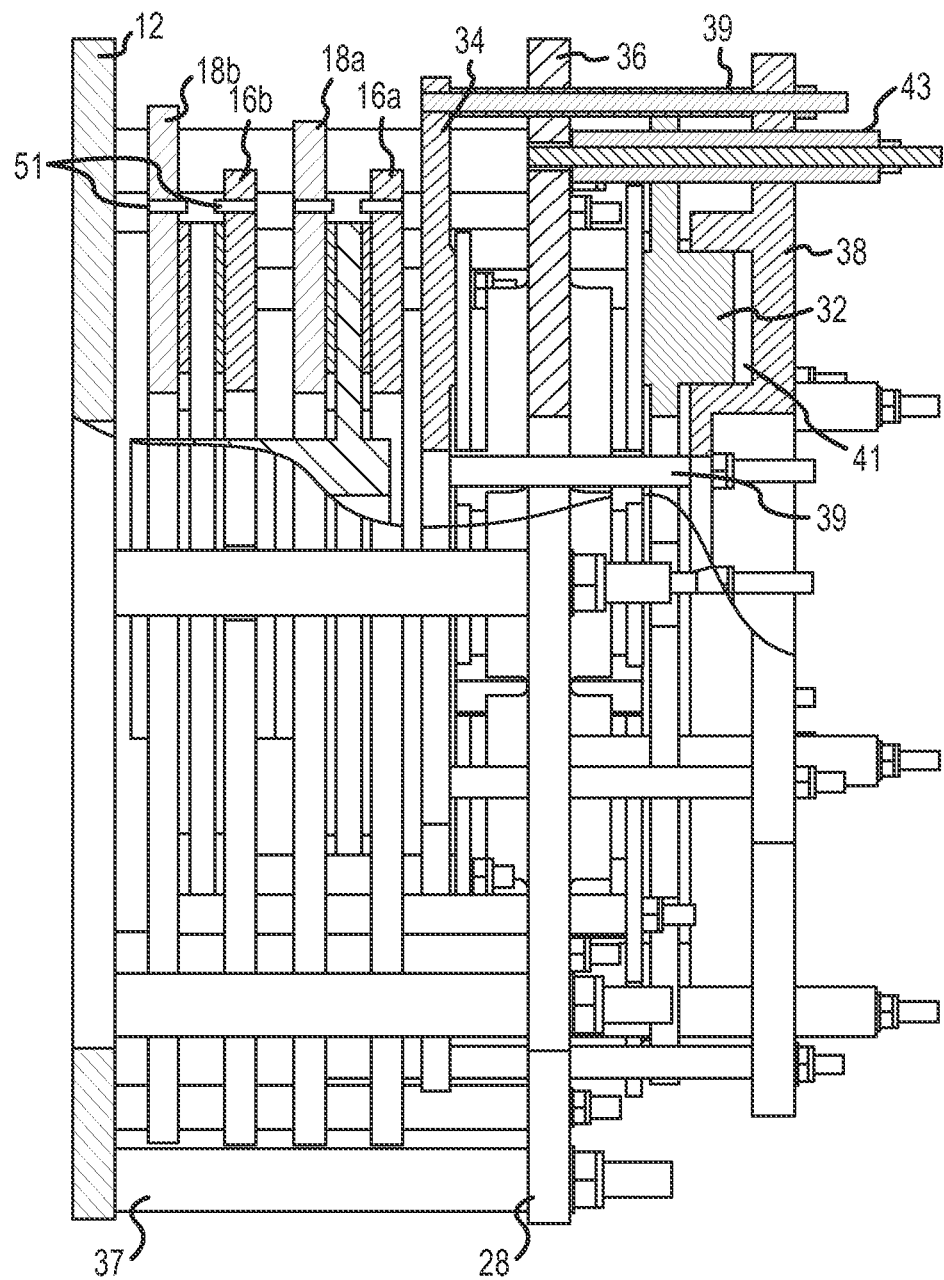
FIG. 8 is a partial cutaway view of the assembly of FIG. 1.

The mounting flange 12 and a powerhead assembly 28 (described in greater detail below) can be coupled together with clamp tubes 37 and aligned with guide tubes 40. The cylinder 38 and the stopper plate 34 can be coupled together with spacer tubes 39, as shown in FIG. 8, and aligned with guide tubes 40. This connection allows the stopper plate 34 and the cylinder 38 to move together as a single sliding part.

Figure 3:
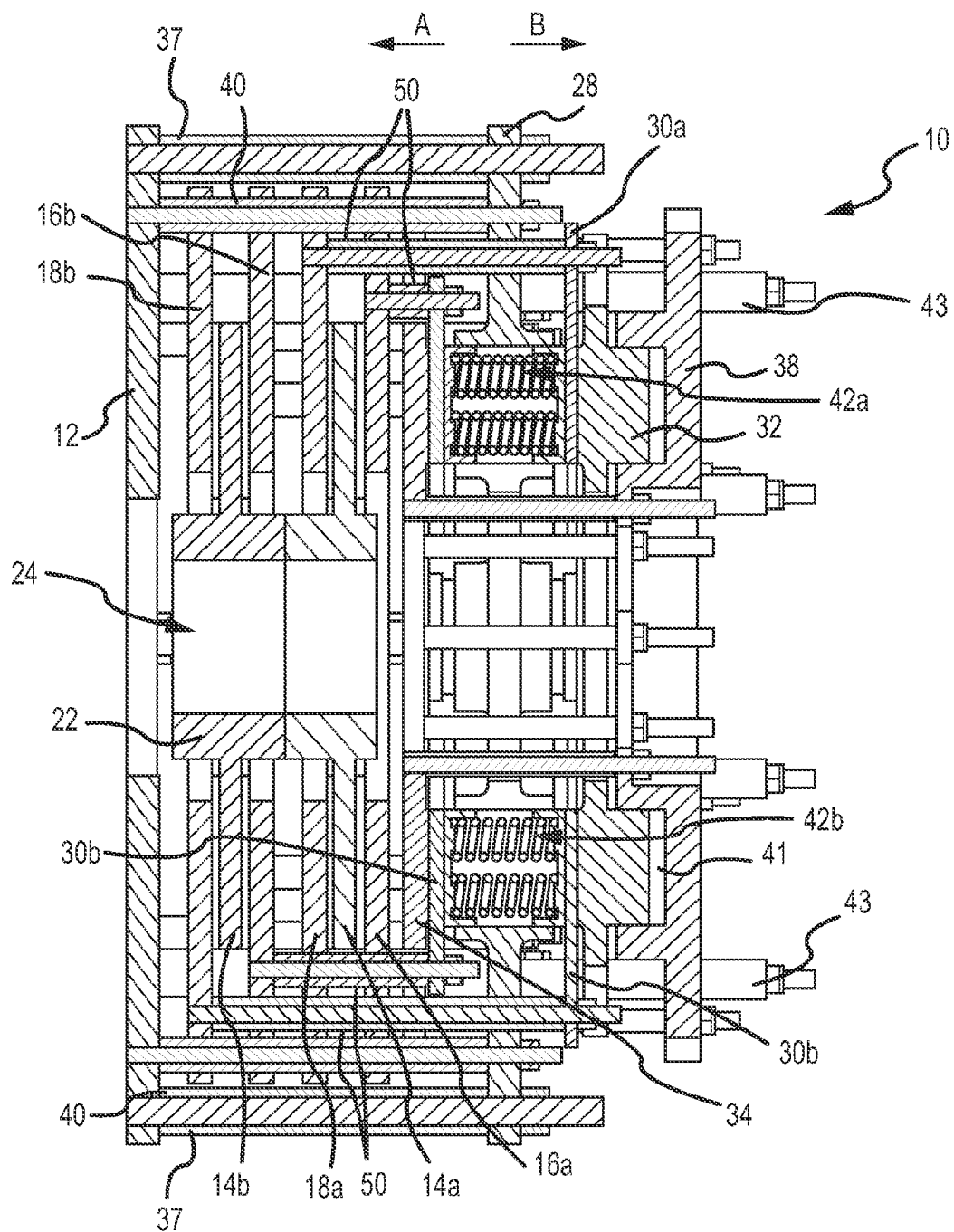
FIG. 3 is a plan view of the section view shown in FIG. 2.

The guide tubes 40 themselves may be disposed between the mounting flange 12, stopper plate 34, spring housing 36, stopper plate 34, and cylinder 38 via any known means, such as via coupling forces between their corresponding components. For example, as can be seen in FIG. 3, guide tubes 40 may be clamped between the mounting flange 12 and the powerhead assembly 28. Note that the assembly 10 may be considered to have a "floating" structure as described in commonly-assigned U.S. Published Application 2010/0018831, the disclosure of which is incorporated herein by reference. More particularly, the reaction plates 16a, 18a, 16b, 18b may float and move axially during the engagement and disengagement operations as the piston 32 and the cylinder 38 move axially. The guide tubes 40 guide the movement of the reaction plates 16a, 18a, 16b, 18b. In one aspect of the teachings, the front reaction plates 16a, 16b react to movement of the stopper plate 34 and the rear reaction plates 18a, 18b react to movement of the piston 32.

Figure 5:
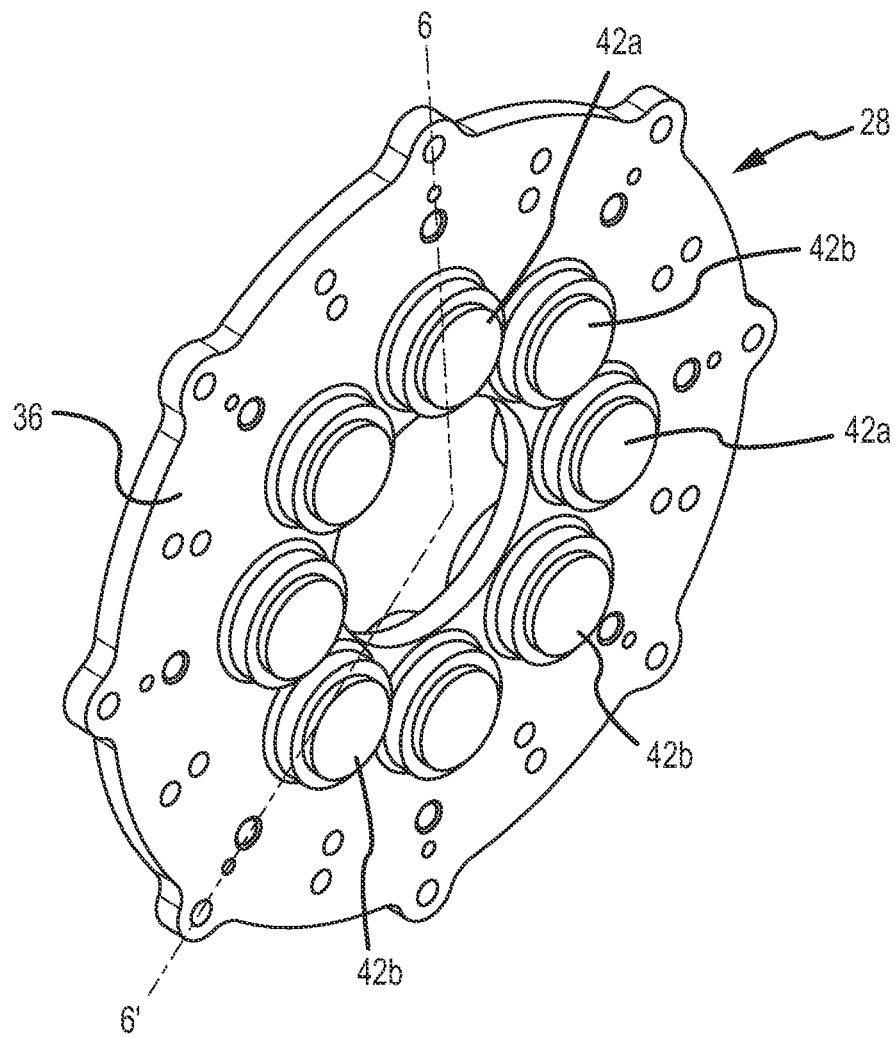
FIG. 5 is a perspective view of a spring housing used in one aspect of the assembly.
Figure 6:
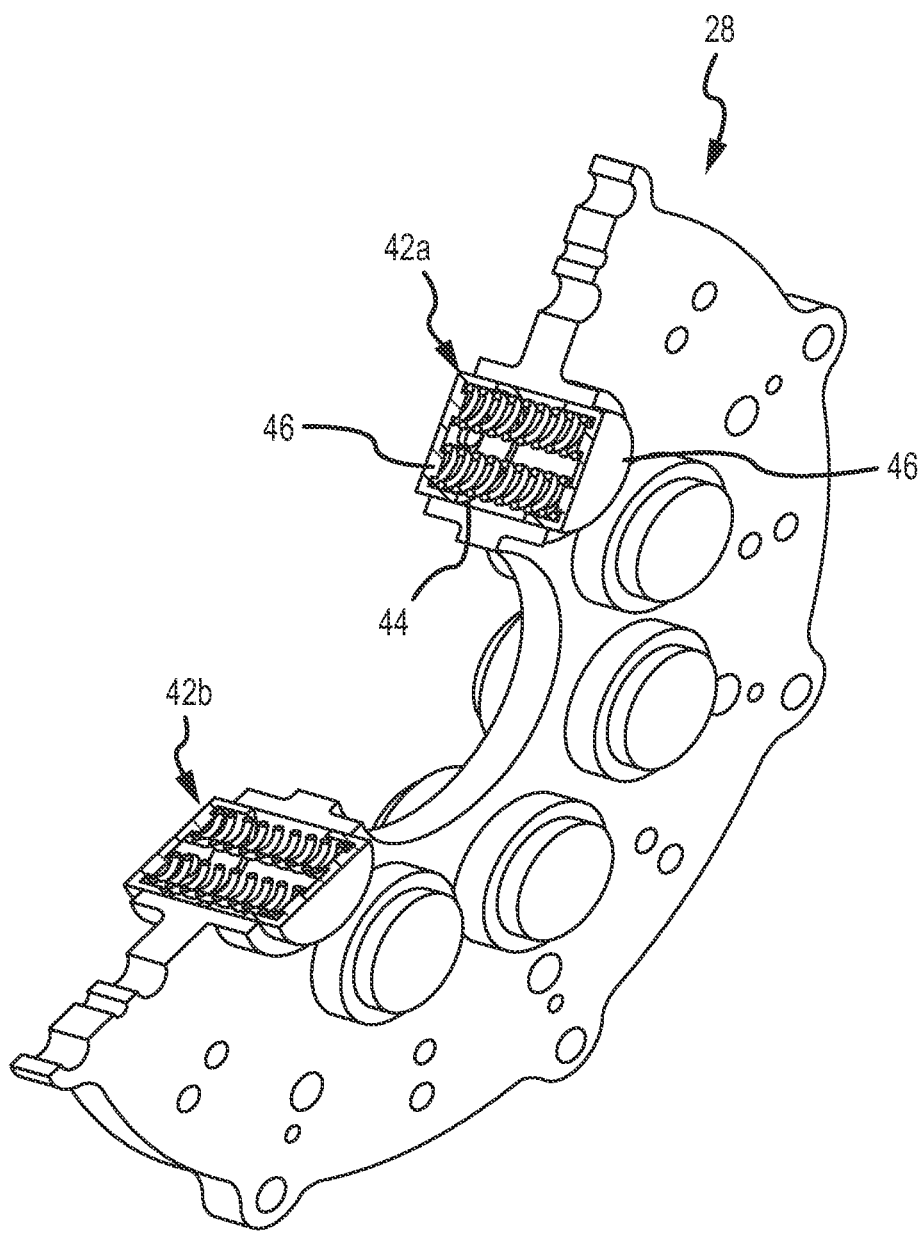
FIG. 6 is a section view of the spring housing taken along line 6-6' in FIG. 5.
Figure 7:
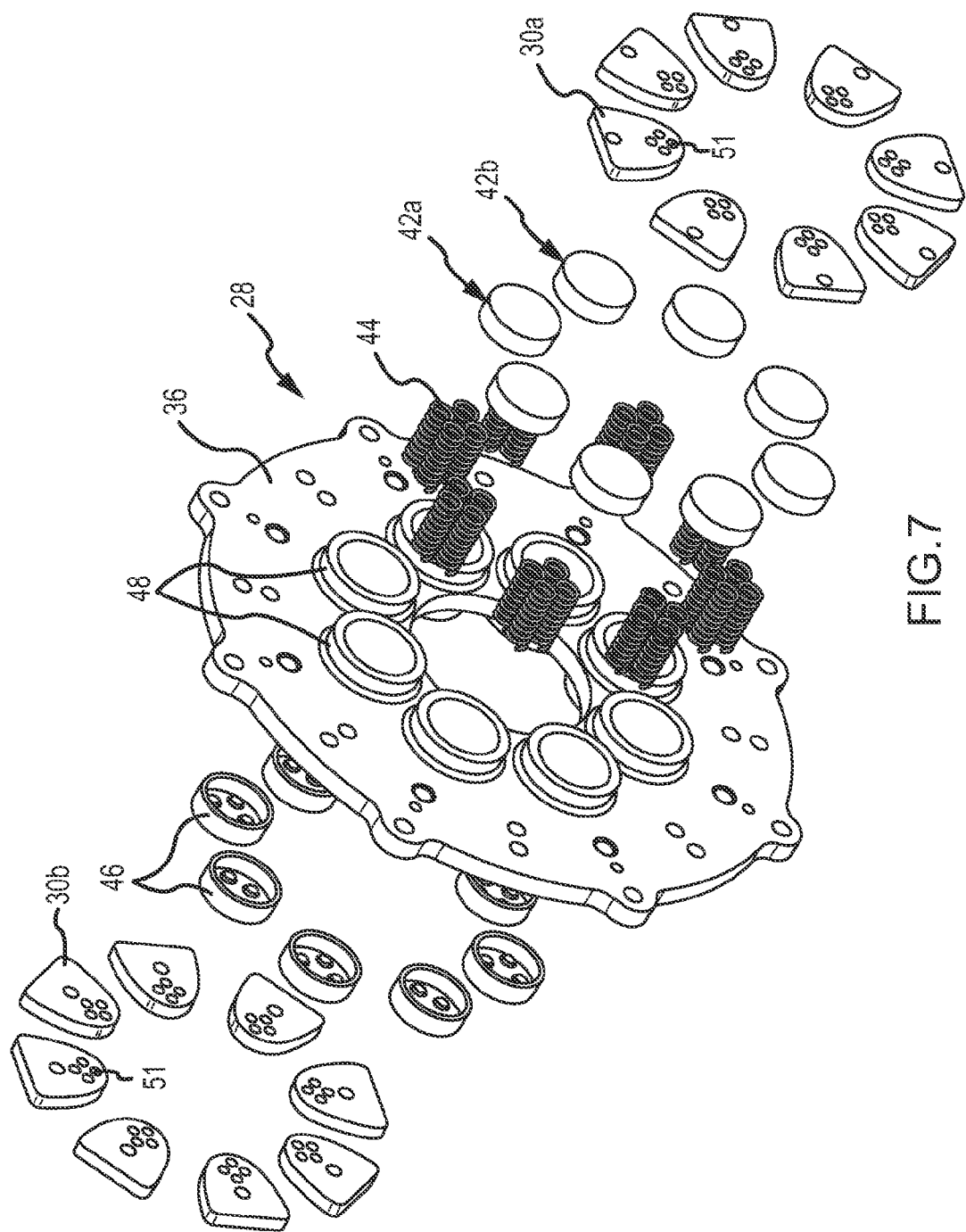
FIG. 7 is an exploded view of the spring housing of FIG. 5.

FIGS. 5 through 7 show the powerhead assembly 28 in greater detail. The powerhead assembly 28 includes the spring housing 36 that supports a plurality of first spring sets 42a and a plurality of second spring sets 42b. Although the illustrated example shows eight spring sets, four of each type 42a, 42b, any number of spring sets may be included in the spring housing 36. The first spring sets 42a are associated with the first rotor 14a and the second spring sets 42b are associated with the second rotor 14b. Each spring set 42a, 42b includes a plurality of springs 44 disposed in between two spring retainers 46. The springs 44 and spring retainers 46 move freely in the axial direction within spring bores 48 in the spring housing 36. As shown in FIG. 3, pressure plates 30a, 30b are disposed on opposite sides of the powerhead assembly 28 and can be connected to the spring retainer 46 via a bolted connection or any other appropriate connection means. The pressure plates 30a, 30b may be formed as wedge-shaped segments, with each segment corresponding to a spring set in a spring housing 36 of the powerhead assembly 28. The front pressure plates 30a may contact the piston 32, while the rear pressure plates 30b may contact the stopper plate 34.

The first and second spring sets 42a, 42b can be disposed in an alternating manner in the spring housing 36 so that the first and second spring sets 42a, 42b distribute force evenly on the on the reaction plates 16a, 18a, 16b, 18b and consequently the rotors 14a, 14b. As shown in FIG. 7, each front and rear pressure plate 30a, 30b is associated with a particular spring set 42a, 42b so that the pressure plates 30a, 30b can move independently from each other. In one aspect of the assembly 10, each pressure plate 30a, 30b may have a one or more holes 51 to accommodate a fastener (e.g., a bolt) connecting the pressure plate 30a, 30b to its corresponding spring retainer 46. Alternatively, the pressure plate 30a, 30b and spring retainer 46 may be formed together as an integral piece through any appropriate process, such as casting.

Since the first and second spring sets 42a, 42b move independently from each other, they can compensate for uneven wear in the friction surfaces 20 by expanding to different degrees. For example, if the friction surfaces 20 in the reaction plates 16a, 18a for the first rotor 14a are more worn than the friction surfaces 20 in the reaction plates 16b, 18b for the second rotor 14b, the first spring sets 42a will expand more than the second spring sets 42b to compensate for the greater wear and ensure that spring force is applied generally evenly to both the first and second rotors 14a, 14b. Similarly, using the first rotor 14a as an example, if the friction surface 20 on the front reaction plate 16a is more worn than the friction surface 20 on the rear reaction plate 18a, the first spring sets 42a will expand and shift axially within the spring housing 36 until they hit the friction surface 20 of the first rotor 14a. Thus, both reaction plates 16a, 18a apply force onto the rotor 14a. Thus, the spring sets 42a, 42b automatically compensate for friction surface 20 wear differences without requiring manual intervention. Also, since the front reaction plates 16a, 16b are functionally connected to stopper plate 34 and the rear reaction plates 18a, 18b are functionally connected to the piston 32, pressurization of the fluid chamber 41 results in release of the assembly 10 even when the springs 44 expand to different lengths.

Figure 2:
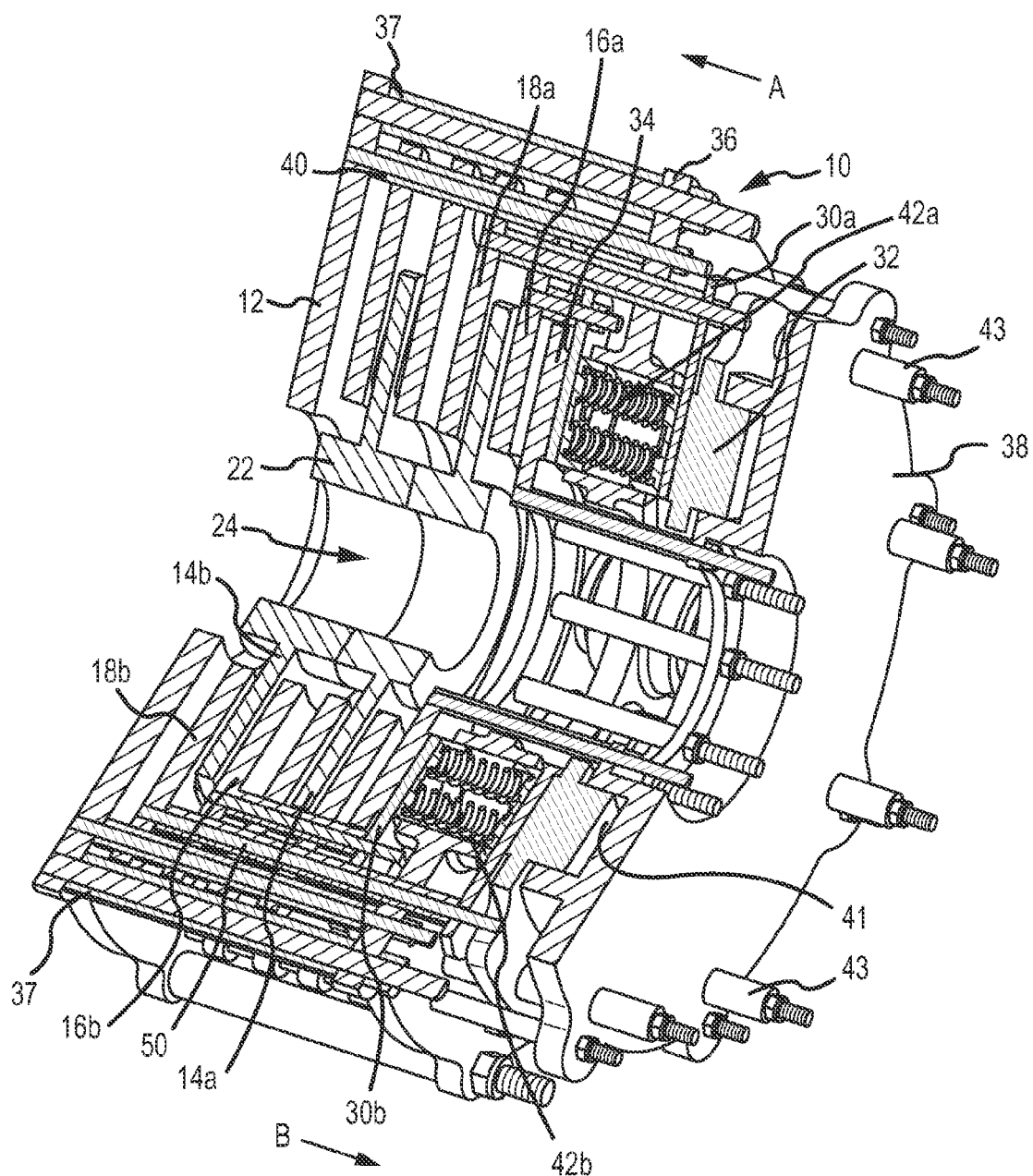
FIG. 2 is a section view of the assembly taken along line 2-2' in FIG. 1.
Figure 4:
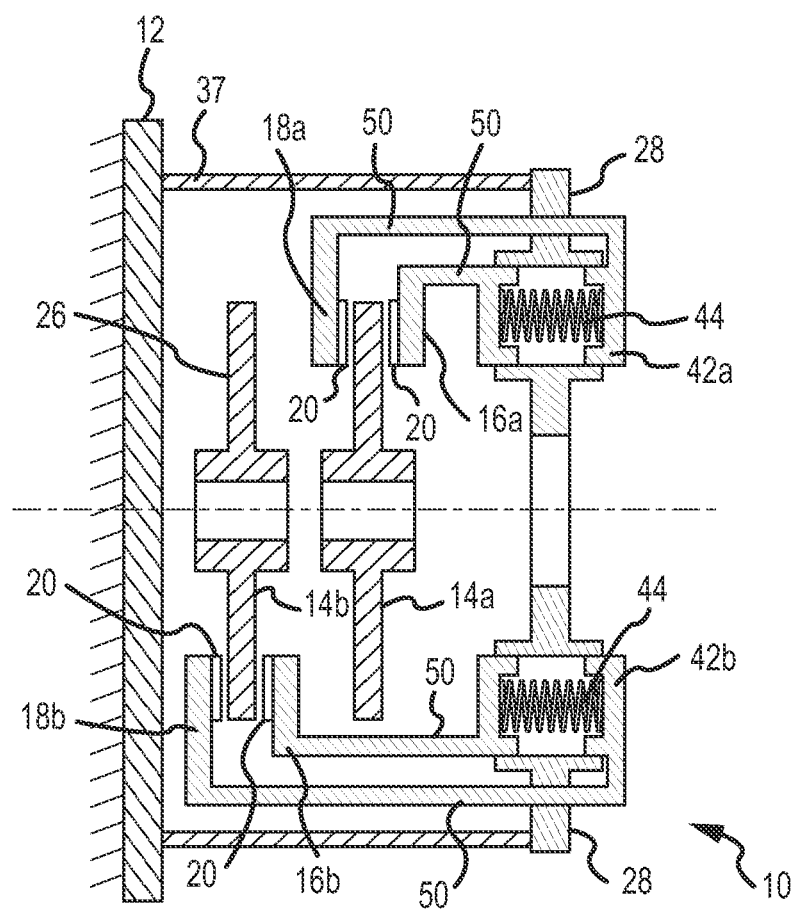
FIG. 4 is a schematic view of the assembly of FIG. 1.

Force transmitting clamp tubes 50 connect the pressure plates 30a, 30b to the reaction plates 16a, 16b, 18a, 18b. As shown in FIGS. 2 and 4, the force transmitting clamp tubes 50 have different lengths so that the pressure plates 30a, 30b can be connected with their associated reaction plates 16a, 16b, 18a, 18b. Moreover, each pressure plate 30a, 30b is associated with either a first spring set 42a (and the first rotor 14a) or a second spring set 42b (and the second rotor 14b). In one aspect of the assembly 10, pressure plates 30a, 30b are connected to the reaction plates 16a, 18a for their corresponding rotor 14a and pressure plates 30a, 30b are connected to the reaction plates 16b, 18b for their corresponding rotor 14b. This configuration generates brake torque on the first and second rotors 14a, 14b when the spring sets 42a, 42b expand. As noted above, since the spring sets 42a, 42b are evenly spaced around the spring housing 36 in an alternating manner, pressure is uniformly distributed on each rotor 14a, 14b. Also, as noted above, since there are separate, independently-acting spring sets 42a, 42b for each rotor 14a, 14b, the pressure distribution will be equal between both rotors 14a, 14b.

The operation of the assembly 10 will now be described in greater detail. When pressure is increased in the fluid chamber 41 (e.g., during a brake release operation), the piston 32 moves toward the mounting flange 12 in the direction shown by arrow A in FIGS. 2 and 3, and the cylinder 38 moves away from the mounting flange 12 in the direction shown by arrow B. Because the stopper plate 34 is connected to the cylinder 38 via the spacer tubes 39, the stopper plate 34 will also move away from the mounting flange 12 (in the direction of arrow B). The stopper plate 34 and the piston 32 move toward each other and compress the springs 44, causing the reaction plates 16a, 18a, 16b, 18b to release the rotors 14a, 14b. The assembly 10 is in the disengaged position at this point.

To engage the rotors 14a, 14b, fluid is evacuated from the fluid chamber 41, releasing the fluid pressure. The springs 44 expand, pressing the front and rear pressure plates 30a, 30b outward against the piston 32 and the stopper plate 34, respectively. This in turn causes the reaction plates 16a, 18a, 16b, 18b to clamp on their respective rotors 14a, 14b. At this point, the assembly 10 is in the engaged condition.

Over time, the friction surfaces 20 wear down and the springs 44 compensate by expanding more. However, if one of the friction pads 20 corresponding to a given rotor 14a, 14b wears more than the others, the spring set 42a, 42b corresponding to that rotor 14a, 14b will expand an additional distance equal to the amount of extra wear during braking. As a result, both rotors 14a, 14b will continue to receive force from the friction pads 20. Conversely, during release, the rotor 14a, 14b with the reaction plate 16a, 18a, 16b, 18b having the additional wear will be released before the other rotor 14a, 14b.

One or more sensors 51 may be mounted on the assembly 10 to measure the amount of wear in the friction surfaces 20. In one aspect, the sensors 51 may be mounted on the powerhead assembly 28 to monitor the distance between the spring housing 36 and each of the front and rear pressure plates 30a, 30b. These distances correspond to the amount of wear in the friction surfaces 20, and the information can be used to check for wear without manual intervention. Alternatively, the sensors 51 may be mounted to the reaction plates 16a, 18a, 16b, 18b as shown in FIG. 8 to monitor the amount of wear in the friction plates 20 more directly.

This data can be sent to a user interface to detect whether the friction surfaces 20 need maintenance and/or replacement.

As a result, an assembly having the above structure ensures that the reaction plates and friction pads apply uniform and equal pressure to both rotors. The assembly described above can automatically compensate for uneven friction pad wear, both between the two pairs as well as between a single pair associated with a given rotor to keep pressure application consistent. The assembly also ensures that all spring sets are disengaged when needed despite their unequal expansion during compensation.

It will be appreciated that the above teachings are merely exemplary in nature and is not intended to limit the present teachings, their application or uses. While specific examples have been described in the specification and illustrated in the drawings, it will be understood by those of ordinary skill in the art that various changes may be made and equivalents may be substituted for elements thereof without departing from the scope of the present teachings as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present teachings not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. An assembly for transmitting force to a shaft, comprising:
 a mounting flange having a central opening to receive the shaft;
 first and second rotors mounted on the shaft and rotatable with the shaft, the first and second rotors each having at least one planar surface;
 first front and rear reaction plates disposed on opposite sides of the first rotor;
 second front and rear reaction plates disposed on opposite sides of the second rotor, wherein the first and second front and rear reaction plates each have at least one friction surface that is engageable with said at least one planar surface on the first and second rotors;
 a piston;
 a cylinder coupled to the piston to form a fluid pressure chamber, wherein the piston moves in a first direction when pressurized fluid enters the fluid pressure chamber and the piston moves in a second direction when pressurized fluid exits the fluid pressure chamber; and
 a powerhead assembly operatively coupled to the piston, the powerhead assembly having
  a spring housing,
  a plurality of first spring sets supported in the spring housing and operatively coupled to the first front and rear reaction plates to bias the first front and rear reaction plates into engagement with the first rotor, and
  a plurality of second spring sets supported in the spring housing and operatively coupled to the second front and rear reaction plates to bias the second front and rear reaction plates into engagement with the second rotor,
  wherein the first spring sets and the second spring sets move independently from each other to separately bias the first front and rear reaction plates into engagement with the first rotor and the second front and rear reaction plates into engagement with the second rotor.

2. The assembly of claim 1, wherein each of the first and second spring sets comprise:
 a plurality of springs; and
 first and second spring retainers on opposite ends of the plurality of springs, wherein the first and second spring retainers retain the plurality of springs in the spring housing.

3. The assembly of claim 1, wherein the spring housing is annular and has a plurality of bores that accommodate the plurality of first and second spring sets.

4. The assembly of claim 1, wherein the first and second spring sets are circumferentially arranged in an alternating manner around the spring housing.

5. The assembly of claim 1, further comprising:
 at least one front pressure plate;
 at least one rear pressure plate, wherein at least one of said plurality of first and second spring sets are disposed between said front and rear pressure plates, and wherein the front pressure plate is operatively coupled to the piston; and
 a stopper plate that is operatively coupled to the cylinder, wherein when pressurized fluid enters the fluid chamber, the piston and the stopper plate move toward each other to push the front and rear pressure plates toward each other against a spring force in the first and second spring sets.

6. The assembly of claim 5, further comprising a plurality of spacer tubes connecting the stopper plate to the cylinder.

7. The assembly of claim 5, further comprising a plurality of clamp tubes that couple the front pressure plate to the first and second rear reaction plates and the rear pressure plate to the first and second front reaction plates.

8. The assembly of claim 1, further comprising at least one sensor for measuring wear on said at least one friction surface.

9. An assembly for transmitting force to a shaft, comprising:
- a mounting flange having a central opening to receive the shaft;
- first and second rotors mounted on the shaft and rotatable with the shaft, the first and second rotors each having at least one planar surface;
- first front and rear reaction plates disposed on opposite sides of the first rotor;
- second front and rear reaction plates disposed on opposite sides of the second rotor, wherein the first and second front and rear reaction plates each have at least one friction surface that is engageable with said at least one planar surface on the first and second rotors;
- a piston;
- a cylinder coupled to the piston to form a fluid pressure chamber;
- a stopper plate that is operatively coupled to the cylinder;
- a plurality of front pressure plates operatively coupled to the piston;
- a plurality of rear pressure plates operatively coupled to the stopper plate;
- a powerhead assembly disposed between the front and rear pressure plates, the powerhead assembly having
  - an annular spring housing having a plurality of bores,
  - a plurality of first spring sets operatively coupled to the first front and rear reaction plates to bias the first front and rear reaction plates into engagement with the first rotor, and
  - a plurality of second spring sets operatively coupled to the second front and rear reaction plates to bias the second front and rear reaction plates into engagement with the second rotor, wherein the first and second spring sets are disposed in the plurality of bores in the spring housing, and at least one of said plurality of first and second spring sets are disposed between said front and rear pressure plates, and wherein the first spring sets and the second spring sets move independently from each other to separately bias the first front and rear reaction plates into engagement with the first rotor and the second front and rear reaction plates into engagement with the second rotor, and
  - at least two clamp tubes connecting the powerhead assembly to the mounting flange.

10. The assembly of claim 9, wherein each of the first and second spring sets comprise:
- a plurality of springs; and
- first and second spring retainers on opposite ends of each of the plurality of springs, wherein the first and second spring retainers retain the plurality of springs in the spring housing.

11. The assembly of claim 10, wherein the first and second spring sets are arranged in an alternating manner in the spring housing.

12. The assembly of claim 10, wherein the front pressure plates are attached to the first spring retainers and the rear pressure plates are attached to the second spring retainers.

13. The assembly of claim 12, wherein the front pressure plates are integrally formed with the first spring retainers and the rear pressure plates are integrally formed with the second spring retainers.

14. The assembly of claim 9, further comprising a plurality of spacer tubes connecting the stopper plate to the cylinder.

15. The assembly of claim 9, further comprising a second plurality of clamp tubes that couple the front pressure plate to the first and second rear reaction plates and the rear pressure plate to the first and second front reaction plates.

16. The assembly of claim 15, further comprising a third plurality of clamp tubes connecting the stopper plate to the cylinder,
wherein when pressurized fluid enters the fluid chamber, the piston and the stopper plate move toward each other to push the front and rear pressure plates toward each other against a spring force in the first and second spring sets to cause the first front and rear reaction plates to disengage from the first rotor and the second front and rear reaction plates to disengage from the second rotor,
and wherein when pressurized fluid exits the fluid chamber, the spring force in the first and second spring sets push the piston and the stopper plate away from each other to cause the first front and rear reaction plates to engage the first rotor.

17. The assembly of claim 9, further comprising at least one sensor for measuring wear on said at least one friction surface.

18. The assembly of claim 1, wherein the first spring sets bias the first front and rear reaction plates into engagement with the first rotor independent of movement of the second spring sets, and
the second spring sets bias the second front and rear reaction plates into engagement with the second rotor independent of movement of the first spring sets.

19. The assembly of claim 1, wherein the first spring sets are respectively disposed between first front and rear pressure plates that are connected to the first front and rear reaction plates, and
the second spring sets are respectively disposed between second front and rear pressure plates that are connected to the second front and rear reaction plates.

20. The assembly of claim 19, wherein the first spring sets bias the first front and rear pressure plates apart, which in turn causes the first front and rear reaction plates to engage with the first rotor, and
the second spring sets bias the second front and rear pressure plates apart, which in turn causes the second front and rear reactions plates to engage with the second rotor.

* * * * *